United States Patent
Shin et al.

(10) Patent No.: US 7,332,896 B2
(45) Date of Patent: Feb. 19, 2008

(54) APPARATUS AND METHOD FOR CONTROLLING SUPPLY VOLTAGE IN MULTIPLE INTERFACE CARD

(75) Inventors: Jong-Hoon Shin, Suwon-si (KR); Kyoung-Hun Kim, Suwon-si (KR); Seong-Hyun Kim, Yongin-si (KR); Yong-Joo Park, Seoul (KR); Jong-Sang Choi, Yongin-si (KR); Jeon-Taek Im, Anseong-si (KR); Zang-Hee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 11/315,704

(22) Filed: Dec. 22, 2005

(65) Prior Publication Data
US 2006/0158809 A1 Jul. 20, 2006

(30) Foreign Application Priority Data
Dec. 28, 2004 (KR) ............... 10-2004-0113695

(51) Int. Cl.
*H02J 1/00* (2006.01)
*G05F 5/00* (2006.01)

(52) U.S. Cl. .................. 323/80; 307/75; 307/86

(58) Field of Classification Search ............ 323/299; 307/80, 72, 75, 82, 85, 86
See application file for complete search history.

(56) References Cited

U.S. PATENT DOCUMENTS
6,404,076 B1 * 6/2002 Matsuda et al. ............ 307/80
7,205,682 B2 * 4/2007 Kuramori .................. 307/80

FOREIGN PATENT DOCUMENTS
JP 06-187533 7/1994
JP 11-275861 10/1999
JP 2002-280097 9/2002
KR 10-2004-0051267 6/2004

* cited by examiner

*Primary Examiner*—Gary L Laxton
(74) *Attorney, Agent, or Firm*—F. Chau & Assoc., LLC

(57) ABSTRACT

An apparatus and method for controlling a supply voltage of a multiple interface card includes a first voltage adjustment unit, a second voltage adjustment unit, an internal circuit, a first voltage controller, and a second voltage controller. The first voltage controller adjusts a first supply voltage to a first internal supply voltage used as an operating voltage of the internal circuit and supplies the first internal supply voltage to the internal circuit. The second voltage adjustment unit adjusts a second supply voltage to a second internal supply voltage used as an operating voltage of the internal circuit and supplies the second internal supply voltage to the internal circuit. The first voltage controller detects the first supply voltage and, according to the first supply voltage, either applies the first supply voltage to the first voltage adjustment unit or blocks the first supply voltage from the first voltage adjustment unit. The second voltage controller detects the second supply voltage and, according to the detected voltage, either applies the second supply voltage to the second voltage adjustment unit or blocks the second supply voltage from the second voltage adjustment unit.

18 Claims, 4 Drawing Sheets

APPARATUS AND METHOD FOR CONTROLLING SUPPLY VOLTAGE IN MULTIPLE INTERFACE CARD

CROSS-REFERENCE TO RELATED APPLICATIONS

This application claims priority to Korean Patent Application No. 10-2004-0113695, filed on Dec. 28, 2004, the disclosure of which is herein incorporated by reference in its entirety.

BACKGROUND OF THE INVENTION

1. Field of the Invention

The present invention relates to an apparatus and method for controlling a supply voltage, and more particularly to an apparatus and method for controlling a supply voltage of a multiple interface card for interfacing with a plurality of hosts.

2. Description of the Related Art

A smart card such as a SIM (Subscriber Identification Module) card is installed in a card holder/acceptor inside a mobile phone. Since the SIM card stores subscriber information including the subscriber's telephone directory, a subscriber can use a second mobile phone as if it is the subscriber's first mobile phone by transferring the SIM card into the second mobile phone.

However, SIM cards generally have a small storage capacity, which may be insufficient for certain applications such as a mobile phone requiring both an identification function and a multimedia storage function. Multiple interface cards are currently under development. Multiple interface cards can receive different supply voltages from a plurality of hosts, either simultaneously or sequentially. The different supply voltages are converted by a supply voltage control apparatus into operating voltages which can be used by CPUs or peripheral devices.

FIG. 1 is a block diagram of a supply voltage control apparatus 100 of a conventional multiple interface card. Referring to FIG. 1, the supply voltage control apparatus 100 includes a first supply voltage receiver 110 for receiving a first supply voltage from a first host (not shown) and a second supply voltage receiver 120 for receiving a second supply voltage from a second host (not shown). The first and second supply voltages are converted by a first voltage adjustment unit 130 and a second voltage adjustment unit 140, respectively, into voltages used by an internal circuit 150.

The first host and the second host operate independently. In general, the first host and the second host can use different supply voltages, and each host can either block or provide supply voltages independently of the other host.

However, in the conventional supply voltage control apparatus 100 shown in FIG. 1 an inverse voltage can be generated. An inverse voltage occurs when the second supply voltage is supplied to the first host or the first supply voltage is supplied to the second host. In the conventional supply voltage control apparatus 100, when either the first or second supply voltage is blocked or interrupted while both the first and second supply voltages are being supplied, the first or second host can be destroyed due to an inverse voltage.

SUMMARY OF THE INVENTION

The present invention provides a supply voltage control apparatus and supply voltage control method capable of preventing a circuit from being destroyed due to an inverse voltage by detecting a supply voltage received from a host and, according to the detected supply voltage, either connecting the circuit to the host or disconnecting the circuit from the host.

According to an aspect of the present invention, a supply voltage control apparatus includes a first voltage adjustment unit, a second voltage adjustment unit, an internal circuit, a first voltage controller, and a second voltage controller.

According to an aspect of the present invention, the first voltage adjustment unit adjusts a first supply voltage to a first internal supply voltage used as an operating voltage of the internal circuit and supplies the first internal supply voltage to the internal circuit. The second voltage adjustment unit adjusts a second supply voltage to a second internal supply voltage used as an operating voltage of the internal circuit and supplies the second internal supply voltage to the internal circuit.

According to an aspect of the present invention, the first voltage controller detects the first supply voltage and, according to the detected first supply voltage, either applies the first supply voltage to the first voltage adjustment unit or blocks the first supply voltage from the first voltage adjustment unit.

According to an aspect of the present invention, the second voltage controller detects the second supply voltage and, according to the detected second supply voltage, either applies the second supply voltage to the second voltage adjustment unit or blocks the second supply voltage from the second voltage adjustment unit.

According to an aspect of the present invention, the first voltage controller comprises a first switch determining whether to block a first conductive path for supplying the first supply voltage to the first voltage adjustment unit.

According to an aspect of the present invention, the first voltage controller further comprises a first voltage detector controlling the first switch in response to the first supply voltage and a first detection voltage. The first voltage detector opens the first switch if the first supply voltage is lower than the first detection voltage.

According to an aspect of the present invention, the second voltage controller comprises a second switch determining whether to block a second conductive path for supplying the second supply voltage to the second voltage adjustment unit.

According to an aspect of the present invention, the second voltage controller further comprises a second voltage detector controlling the second switch in response to the second supply voltage and a second detection voltage.

According to an aspect of the present invention, the second voltage detector opens the second switch if the second supply voltage is lower than the second detection voltage.

According to an aspect of the present invention, the first detection voltage is the same as the second detection voltage. The supply voltage control apparatus further comprises: a first supply voltage receiver receiving a first supply voltage generated by a predetermined first host and applying the first supply voltage to the first voltage adjustment unit; and a second supply voltage receiver receiving a second supply voltage generated by a predetermined second host and applying the second supply voltage to the second voltage adjustment unit.

According to an aspect of the present invention, the first supply voltage is different from the second supply voltage. According to an aspect of the present invention, the first internal supply voltage is the same as the second internal supply voltage.

According to another aspect of the present invention, a supply voltage control method includes the steps of receiving at least one supply voltage from a host; detecting the supply voltage; and blocking the supply voltage if the supply voltage is lower than a predetermined voltage.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF THE EXEMPLARY EMBODIMENTS

Hereinafter, exemplary embodiments of the present invention will be described in detail with reference to the accompanying drawings. Like reference numbers refer to similar or identical elements throughout the description of the figures.

Figure 1:
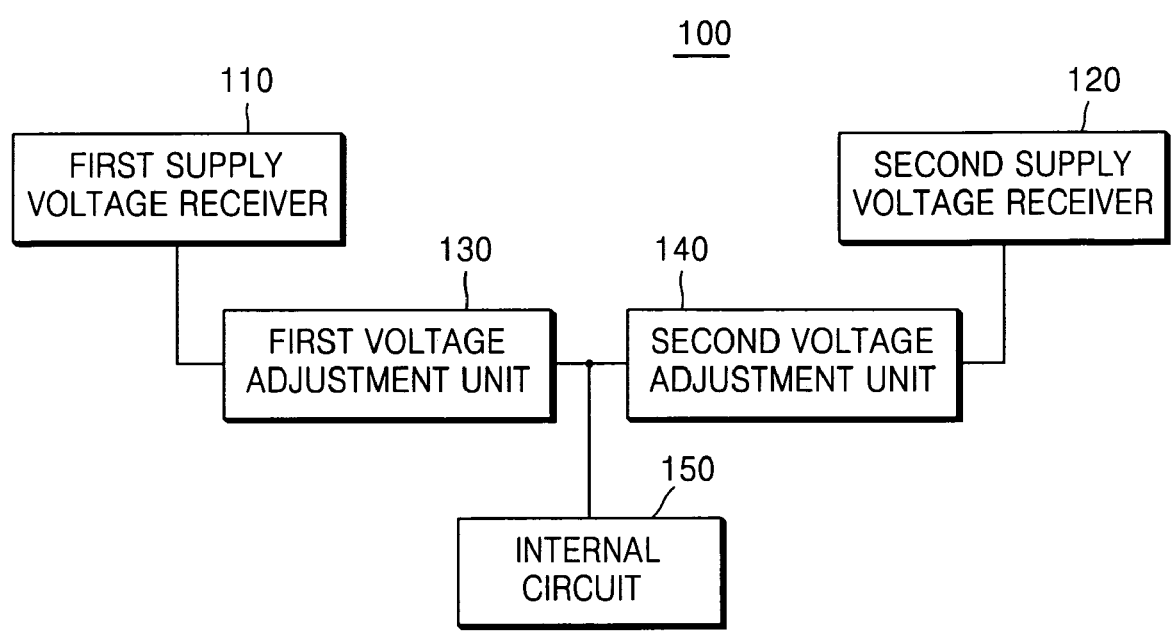
FIG. 1 is a block diagram of a conventional supply voltage control apparatus.
Figure 2:
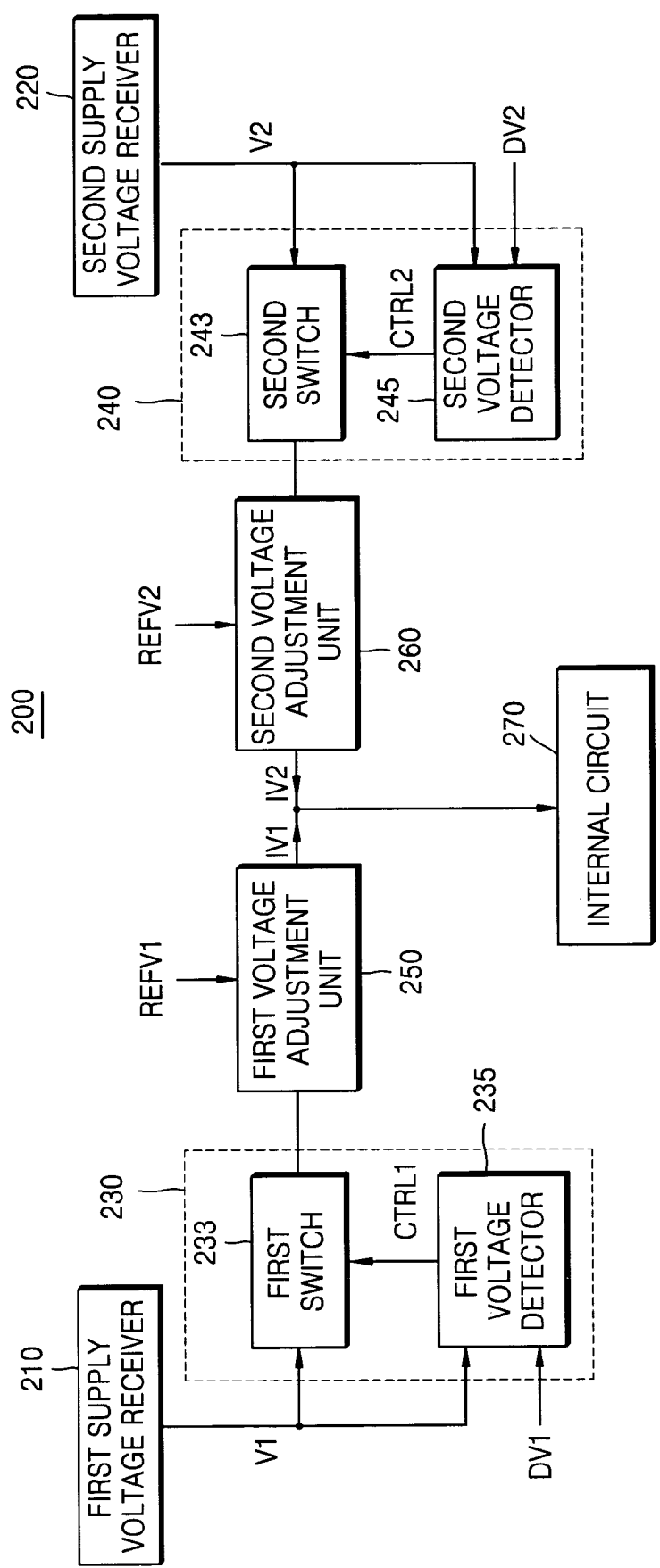
FIG. 2 is a block diagram of a supply voltage control apparatus according to an exemplary embodiment of the present invention.

FIG. 2 is a block diagram of a supply voltage control apparatus 200 of a multiple interface card, according to an exemplary embodiment of the present invention. Referring to FIG. 2, the supply voltage control apparatus 200 includes a first supply voltage receiver 210 for receiving a first supply voltage V1 applied from a first host (not shown), and a second supply voltage receiver 220 for receiving a second supply voltage V2 applied from a second host (not shown).

For example, the first host is a smart card host and the second host is a memory card host. The first host may be a host for a SIM (Subscriber Identification Module) card. The SIM card stores a subscriber's telephone directory and a personnel identification number (PIN) and performs an identification function. The second host may be a host for a MMC card, a Secure Digital™ card, a Memory Stick™ card, a Compact Flash™ card, or a Smart Media™ card. The memory card can be used to store a large amount of data.

A multiple interface card (not shown) including the first host (smart card host) and the first supply voltage receiver 210, according to an embodiment of the present invention, communicates based on a contact-type smart card interface standard such as an ISO 7816 protocol. ISO 7816 is an international standard that describes the interface requirements for contact-type smart cards. Part 3 of this standard defines electronic signals and transmission protocols of the card.

A multiple interface card including the first host and the first supply voltage receiver 210, according to another embodiment of the present invention, communicates based on a contactless smart card interface standard such as an ISO 14443 protocol. ISO 14443 is a four-part international standard for contactless smart cards. It is to be understood that any contact-type smart card interface standard and contactless smart card interface standard should be suitable for implementing the invention. A multiple interface card including the second host (memory card host) and the second supply voltage receiver 220 communicates based on a protocol suitable for a corresponding memory card bus.

A SIM card host and one or more memory card hosts operate independently. The first host and the second host can use different supply voltages and independently block or provide corresponding supply voltages. The SIM card host and the one or more memory card hosts can use different supply voltages and independently block or provide corresponding supply voltages.

Returning to FIG. 2, the supply voltage control apparatus 200 includes a first voltage controller 230 and a first voltage adjustment unit 250. The supply voltage controller 200 converts the first voltage V1 into a first internal supply voltage IV1 that can be used by an internal circuit 270. In accordance with an embodiment of the present invention, the supply voltage controller 200 further includes a second voltage controller 240 and a second voltage adjustment unit 260. The supply voltage controller 200 converts the second supply voltage V2 into a second internal supply voltage IV2 that can be used by the internal circuit 270.

The internal circuit 270 includes a CPU (not shown) and peripheral devices (not shown) for operating a multiple interface card system. The internal circuit 270 performs operations using internal supply voltages (for example, the first and second internal supply voltages, IV2 and IV2, respectively).

The multiple interface card, in accordance with an embodiment of the present invention, can communicate simultaneously with the first and second hosts. For example, the first voltage V1 is received from the first host thorough the first supply voltage receiver 210 and the second supply voltage V2 is received from the second host through the second supply voltage receiver 220.

Since a supply voltage supplied from each host is generally higher than an operating voltage of the internal circuit 270, the voltage adjustment units 250 and 260 are needed. For example, according to an exemplary embodiment of the present invention, the first supply voltage V1 supplied from the first host (smart card host) is 5V, the second supply voltage V2 supplied from the second host (memory card host) is 3.3 V, and an operating voltage of the internal circuit 270 is 1.8 V.

The first voltage adjustment unit 250 receives the first voltage V1 of 5 V, converts the first voltage V1 into a first internal supply voltage IV1 for use as an operating voltage of the internal circuit 270, and supplies the first internal supply voltage IV1 to the internal circuit 270. Similarly, the second voltage adjustment 260 receives the second supply voltage V2 of 3.3 V, converts the second supply voltage V2 into a second internal supply voltage IV2 for use as an operating voltage of the internal circuit 270, and supplies the second internal supply voltage IV2 to the internal circuit 270. The first and second internal supply voltages IV1 and IV2 can be the same.

In a conventional supply voltage control apparatus, while first and second supply voltages V1 and V2 are simultaneously supplied, if the first supply voltage V1 is blocked (e.g., due to an unexpected cause), an inverse voltage is generated by the second supply voltage V2, which can destroy a circuit receiving the first supply voltage V1. Similarly, if the second supply voltage V2 is blocked, an inverse voltage is generated by the first supply voltage V1, which can destroy a circuit receiving the second supply voltage V2.

According to an embodiment of the present invention, the voltage controllers 230 and 240 are used to control the first and second supply voltages V1 and V2 to be supplied to the first and second voltage adjustment units 250 and 260.

As shown in FIG. 2, the first voltage controller 230 includes a first voltage detector 235 and a first switch 233. The first voltage detector 235 detects a received first supply voltage V1, compares the detected first supply voltage V1 with a predetermined first detection voltage DV1, and outputs a first control signal CTRL1. According to the first control signal CTRL1, the first switch 233 determines whether to block a first conductive path for supplying the first supply voltage V1 to the first voltage adjustment unit 250.

The second voltage controller 240 includes a second voltage detector 245 and a second switch 243. The second voltage detector 245 detects a received second supply voltage V2, compares the detected second supply voltage V2 with a predetermined second detection voltage DV2, and outputs a second control signal CTRL2. According to the second control signal CTRL2, the second switch 243 determines whether to block a second conductive path for supplying the second supply voltage V2 to the second voltage adjustment unit 260.

Figure 3:
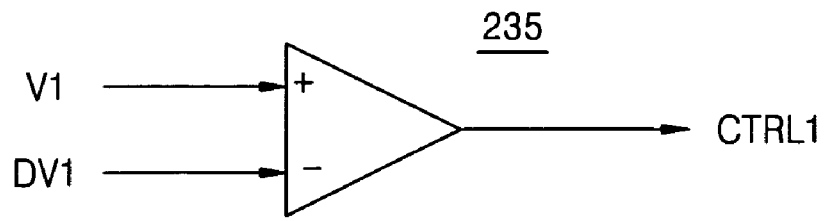
FIG. 3 is a circuit diagram of a voltage detector of the supply voltage control apparatus shown in FIG. 2.

FIG. 3 shows an example of the first voltage detector 235 shown in FIG. 2. The second voltage detector 245 has the same structure as the first voltage detector 235, except for receiving a different supply voltage. Therefore, for the convenience of description, only the first voltage detector 235 will be described below.

Referring to FIGS. 2 and 3, when a first supply voltage V1 and a second supply voltage V2 are supplied, the first voltage detector 235 of the first voltage controller 230 compares the first supply voltage V1 (for example, 5 V) with a predetermined first detection voltage DV1 (for example, 1.5 V) and applies a first control signal CTRL1 to the first switch 233.

If the first supply voltage V1 is higher than the first detection voltage DV1, the first control signal CTRL1 is positive. On the other hand, if the first supply voltage V1 is lower than the first detection voltage DV1, the first control signal CTRL1 is negative.

If a positive first control signal CTRL1 is received, the first switch 233 is closed and the first supply voltage V1 is supplied to the first voltage adjustment unit 250.

However, for example, if the first supply voltage V1 is blocked, the first supply voltage V1 becomes lower than the first detection voltage DV1, and the first voltage detector 235 of the first voltage controller 230 outputs a negative first control signal CTRL1 to the first switch 233.

If the negative first control signal CTRL1 is received, the first switch 233 is opened and a first conductive path between the first supply voltage receiver 210 and the first voltage adjustment unit 250 is blocked.

Accordingly, even when the second supply voltage V2 is supplied as an inverse voltage to a circuit receiving the first supply voltage V1, such as the first voltage adjustment unit 250, the circuit is not destroyed. Even when the first supply voltage V1 is supplied and the second supply voltage V2 is blocked, the second voltage detector 245 and the second switch 243 of the second voltage controller 240 operate as described above, and a conductive path between the second supply voltage receiver 220 and the second voltage adjustment unit 260 is blocked, preventing a circuit receiving the second supply voltage V2 from being destroyed.

Figure 4:
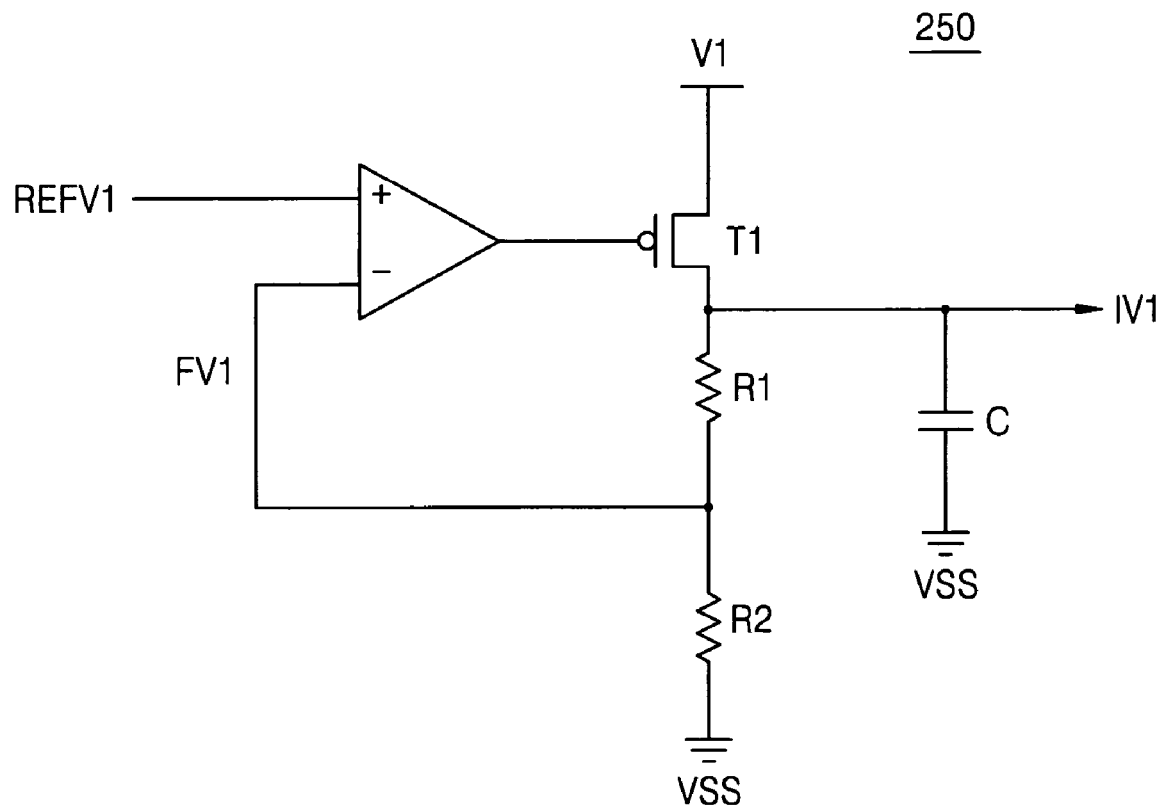
FIG. 4 is a circuit diagram of a first voltage adjustment unit of the supply voltage control apparatus shown in FIG. 2.
Figure 5:
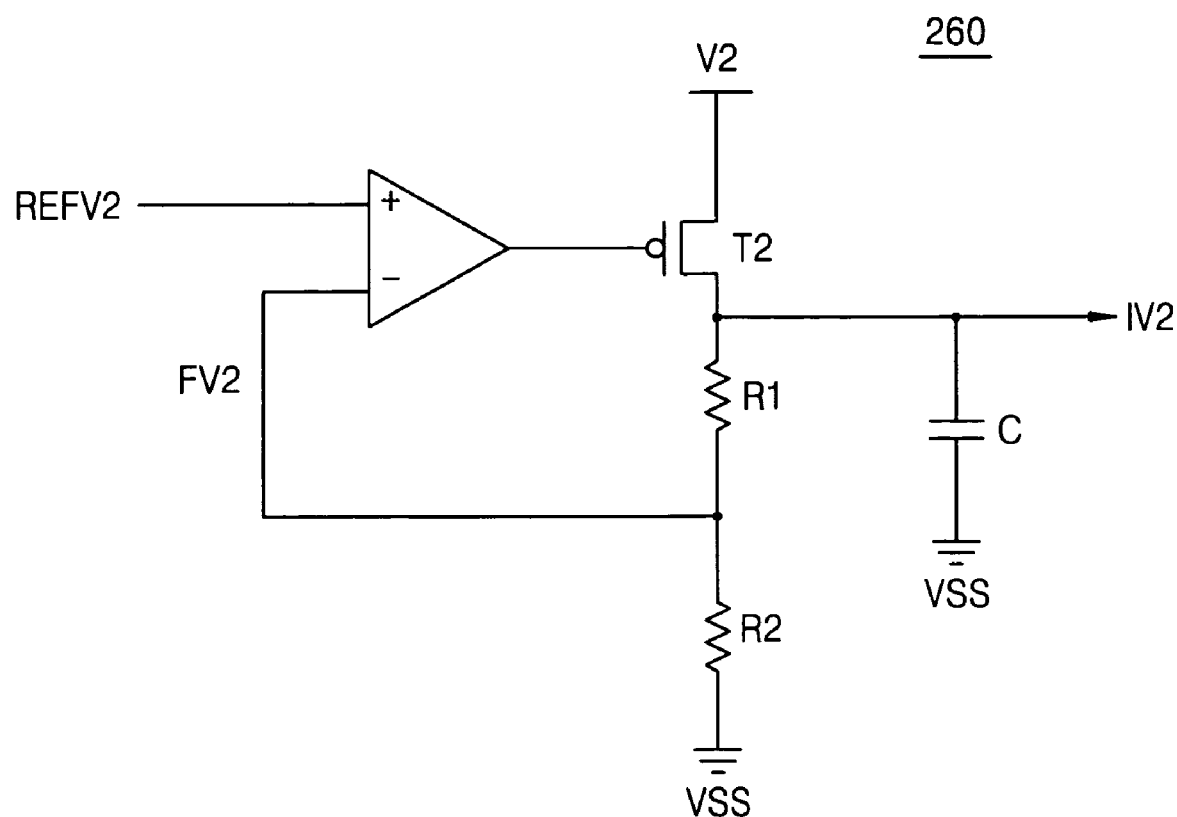
FIG. 5 is a circuit diagram of a second voltage controller of the supply voltage control apparatus shown in FIG. 2.

FIG. 4 is a circuit diagram of the first voltage adjustment unit 250 shown in FIG. 2. FIG. 5 is a circuit diagram of the second voltage adjustment unit 260 shown in FIG. 2. Referring to FIGS. 4 and 5, if feedback voltages FV1 and FV2 are lower than reference voltages REFV1 and REFV2, respectively, transistors T1 and T2 are turned on and the first and second internal supply voltages IV1 and IV2 rise. On the other hand, if the feedback voltages FV1 and FV2 are higher than the reference voltages REFV1 and REFV2, respectively, the transistors T1 and T2 are turned off and the first and second internal supply voltages IV1 and IV2 are maintained.

By using the first and second voltage adjustment units 250 and 260, a constant operating voltage can be supplied to the internal circuit 270. Resistances R1 and R2 and capacitance C can vary according to a particular circuit design. It will be understood that various configurations of the first and second voltage adjustment units 250 and 260, as shown in FIGS. 4 and 5, should be suitable for implementing the invention.

As described above, according to a supply voltage control apparatus, according to exemplary embodiments of the present invention, detects supply voltages and blocks a conductive path supplying the supply voltage if the detected voltage is lower than a predetermined voltage to prevent a circuit from being destroyed due to an inverse voltage. A supply voltage control apparatus, according to embodiments of the present invention, makes it is possible to stably operate a multiple interface card system.

Although the exemplary embodiments of the present invention have been described in detail with reference to the accompanying drawings for the purpose of illustration, it is to be understood that the inventive processes and apparatus are not to be construed as limited thereby. It will be readily apparent to those of reasonable skill in the art that various modifications to the foregoing exemplary embodiments may be made without departing from the scope of the invention as defined by the appended claims, with equivalents of the claims to be included therein.

What is claimed is:

1. A supply voltage control apparatus comprising:
   a first voltage adjustment unit adjusting a first supply voltage to a first internal supply voltage used as an operating voltage of an internal circuit and supplying the first internal supply voltage to the internal circuit;
   a second voltage adjustment unit adjusting a second supply voltage to a second internal supply voltage used as the operating voltage of the internal circuit and supplying the second internal supply voltage to the internal circuit;
   a first voltage controller detecting the first supply voltage by comparing the first supply voltage with a predetermined first detection voltage and outputting a first control signal as a result of the comparison and, according to the first control signal, either applying the first supply voltage to the first voltage adjustment unit or blocking the first supply voltage from the first voltage adjustment unit; and
   a second voltage controller detecting the second supply voltage by comparing the second supply voltage with a predetermined second detection voltage and outputting a second control signal as a result of the comparison and, according to the second control signal, either applying the second supply voltage to the second voltage adjustment unit or blocking the second supply voltage from the second voltage adjustment unit.

2. The supply voltage control apparatus of claim 1, wherein the first voltage controller comprises:
   a first switch selectively providing first conductive path for supplying the first supply voltage to the first voltage adjustment unit.

3. The supply voltage control apparatus of claim 2, wherein the first voltage controller further comprises:
a first voltage detector producing the first control signal for controlling the first switch in response to comparing the first supply voltage and the predetermined first detection voltage.

4. The supply voltage control apparatus of claim 3, wherein the first control signal from the first voltage detector opens the first switch if the first supply voltage is lower than the predetermined first detection voltage.

5. The supply voltage control apparatus of claim 4, wherein the second voltage controller comprises:
a second switch selectively providing a second conductive path for supplying the second supply voltage to the second voltage adjustment unit.

6. The supply voltage control apparatus of claim 5, wherein the second voltage controller further comprises:
a second voltage detector producing the second control signal for controlling the second switch in response to comparing the second supply voltage and the predetermined second detection voltage.

7. The supply voltage control apparatus of claim 6, wherein the second control signal from the second voltage detector opens the second switch if the second supply voltage is lower than the predetermined second detection voltage.

8. The supply voltage control apparatus of claim 7, wherein the predetermined first detection voltage is the same as the predetermined second detection voltage.

9. The supply voltage control apparatus of claim 1, further comprising:
a first supply voltage receiver receiving a first supply voltage generated by a predetermined first host and applying the first supply voltage to the first voltage controller; and
a second supply voltage receiver receiving a second supply voltage generated by a predetermined second host and applying the second supply voltage to the second controller.

10. The supply voltage control apparatus of claim 9, wherein the first supply voltage receiver communicates with the first host based on a contact-type smart card interface standard.

11. The supply voltage control apparatus of claim 10, wherein the contact-type smart card interface standard is an ISO 7816 protocol.

12. The supply voltage control apparatus of claim 9, wherein the first supply voltage receiver communicates with the first host based on a contactless-type smart card standard.

13. The supply voltage control apparatus of claim 9, wherein the contactless-type smart card standard is an ISO 14443 protocol.

14. The supply voltage control apparatus of claim 1, wherein the first supply voltage is different from the second supply voltage.

15. The supply voltage control apparatus of claim 1, wherein the first internal supply voltage is the same as the second internal supply voltage.

16. A supply voltage control method comprising:
adjusting a first supply voltage to a first internal supply voltage used as an operating voltage of an internal circuit and supplying the first internal supply voltage to the internal circuit;
adjusting a second supply voltage to a second internal supply voltage used as an operating voltage of an internal circuit and supplying the second internal supply voltage to the internal circuit;
detecting the first supply voltage by comparing the first supply voltage with a predetermined first detection voltage and outputting a first control signal as a result of the comparison and, according to the first control signal, either applying the first supply voltage to a first circuit element or blocking the first supply voltage from the first circuit element; and
detecting the second supply voltage by comparing the second supply voltage with a predetermined second detection voltage and outputting a second control signal as a result of the comparison and, according to the second control signal, either applying the second supply voltage to a second circuit element or blocking the second supply voltage from the second circuit element.

17. The supply voltage control method of claim 16, wherein the first supply voltage is different from the second supply voltage.

18. The supply voltage control method of claim 16, wherein the first internal supply voltage is the same as the second internal supply voltage.

* * * * *